United States Patent [19]

McKinney et al.

[11] Patent Number: 4,599,392
[45] Date of Patent: Jul. 8, 1986

[54] INTERPOLYMERS OF ETHYLENE AND UNSATURATED CARBOXYLIC ACIDS

[75] Inventors: Osborne K. McKinney; David P. Flores, both of Lake Jackson; David A. Eversdyk, Angleton, all of Tex.

[73] Assignee: The Dow Chemical Company, Midland, Mich.

[21] Appl. No.: 504,032

[22] Filed: Jun. 13, 1983

[51] Int. Cl.$^4$ ............... C08F 20/06; C08F 120/06
[52] U.S. Cl. ................... 526/318.6; 526/329; 526/331
[58] Field of Search ............ 526/317, 318.6, 329, 526/331

[56] References Cited

U.S. PATENT DOCUMENTS

| | | | |
|---|---|---|---|
| 3,520,861 | 7/1970 | Thomson et al. | 428/500 |
| 3,884,857 | 5/1975 | Ballard et al. | 524/487 |
| 4,248,990 | 2/1981 | Pieski et al. | 526/317 |
| 4,252,924 | 2/1981 | Chatterjee | 526/317 |

Primary Examiner—Joseph L. Schofer
Assistant Examiner—Peter F. Kulkosky
Attorney, Agent, or Firm—W. J. Lee

[57] ABSTRACT

Homogeneous, random interpolymers of ethylene and lesser amounts by weight of olefinically-unsaturated comonomers are prepared in a substantially constant environment, substantially steady-state reaction mixture, in a well-stirred autoclave reactor, in continuous single-phase operation, using elevated synthesis conditions wherein the temperature and pressure are elevated to an amount high enough to approach, reach, or surpass the molecular weight distribution boundary.

38 Claims, 1 Drawing Figure

FIGURE 1

INTERPOLYMERS OF ETHYLENE AND UNSATURATED CARBOXYLIC ACIDS

BACKGROUND

Interpolymers of ethylene and unsaturated carboxylic acids, such as acrylic acid and methacrylic acid, are well known. This present disclosure pertains to such interpolymers when made under steady state conditions in stirred reactors at high pressure and elevated temperature and using a free-radical type initiator, in contradistinction to polymers made under non-steady state conditions or in non-stirred tubular reactors or in batch reactions, and in contradistinction to block copolymers or graft copolymers.

Patents which disclose interpolymerizations of ethylene and unsaturated carboxylic acids in a steady state reaction at high temperature and high pressure in a stirred reactor in the presence of a free-radical initiator are, e.g., Canadian Pat. No. 655,298 (and its U.S. counterpart U.S. Pat. No. 4,351,931): U.S. Pat. Nos. 3,239,370; 3,520,861; 3,658,741; 3,884,857; 3,988,509; 4,248,990; and U.S. Pat. No. 4,252,924.

U.S. Pat. No. 3,239,370 discloses a random copolymerization of ethylene with an unsaturated carboxylic acid (e.g. acrylic acid) in a stirred autoclave operated at 16,000 psi, and 210° C. using a peroxy initiator, the so-formed copolymer being particularly useful as a coating for non-metallic substrates.

U.S. Pat. No. 3,520,861 discloses a substantially homogeneous, compositionally uniform, random copolymer of ethylene/unsaturated acid (e.g. acrylic acid, methacrylic acid, crotonic acid) prepared in a continuous manner in a stirred autoclave at high pressure and elevated temperature, using a free-radical initiator (such as a peroxide). The temperature of the polymerization is disclosed as being in the range of about 120° C. to about 300° C., preferably about 150° C. to about 250° C. The pressure of the polymerization is disclosed as being in the range of at least 1000 atmospheres, preferably between about 1000–3000 atmospheres, esp. between 1100–1900 atmospheres.

Canadian Pat. No. 655,298 and its U.S. counterpart (U.S. Pat. No. 4,351,931) discloses homogeneous, compositionally uniform, random copolymers of ethylene and unsaturated carboxylic acids (e.g. acrylic acid) wherein said copolymer comprises at east about 90% by weight of ethylene with a melt index of 0.01 to 30 g/10 minutes. The copolymers are prepared in a well-stirred reactor at a pressure of at least 1000 atmospheres, at 90°–280° C., using a free radical initiator, while maintaining the ratio of monomers (ethylene/acid) in the range of 10,000/1 to 50/1 by weight, the process being performed continuously by feeding monomers in, while removing reaction mixture, and maintaining a constant reaction environment.

U.S. Pat. No. 3,658,741 discloses homogeneous copolymers of ethylene and unsaturated carboxylic acids and esters, prepared in the presence of a chain transfer agent, a free radical catalyst, a temperature between 100° C.–300° C. and pressure between 100 and 1000 atmospheres, using turbulent agitation; the reaction is said to take place in the vapor phase and prepares very low mol. wt. copolymers.

U.S. Pat. Nos. 3,884,857 and 3,988,509 disclose the preparation of copolymers, such as ethylene/acrylic acid copolymers in a continuous, high pressure, freeradical polymerization process, at 100°–250° C. and 1000–2500 atmospheres of pressure.

U.S. Pat. No. 4,248,990 discloses copolymers, e.g. ethylene/acrylic acid copolymers which are said to distinguish over the random copolymers of Canadian Pat. No. 655,298 and of U.S. Pat. No. 3,520,861 by virtue of being non-random. This non-randomness is said to be the result of operating the steady state, high pressure, stirred reactor at a pressure of from 0 to about 500 psi above, and at temperature of from 0°–15° C. above, that needed to maintain a single phase reaction mixture at the given concentration of copolymer in the reaction mixture and at the given acid comonomer content of the copolymer.

U.S. Pat. No. 4,252,924 discloses the preparation of non-random copolymers, e.g. ethylene/acrylic acid copolymers in at least two constant environment, stirred autoclaves in series, each using a single phase reaction mixture, but where each succeeding autoclave is maintained at a temperature of at least 30° C. above that of the preceding autoclave.

In the ordinary course of events, operators of processes are not inclined to empoy more energy (temperature and/or pressure) than is deemed necessary to obtain a given product, in the absence of any recognized benefit to be derived from such additional expense. We have now found that there are unexpected benefits to be derived from employing more energy (temperature and pressure) than is generally deemed to be sufficient in the production of interpolymers of ethylene.

SUMMARY OF THE INVENTION

With reference to random interpolymers of ethylene and olefinically-unsaturated organic comonomers prepared in a well-stirred autoclave, in the presence of a free-radical initiator, under substantially constant conditions of temperature and pressure and substantially steady state, continuous operation, it has now been found, surprisingly and unexpectedly, that substantial and useful improvements are found by maintaining the synthesis conditions of temperature and pressure elevated hiqh enough above the phase boundary that exists between the two-phase and single-phase conditions, for a given comonomer concentration and polymer concentration in the polymerization mixture, to closely approach, reach, and/or surpass the respective molecular weight distribution (MWD) boundary, i.e., the synthesis conditions at which the ratio of the weight average mol. wt./number average mol. wt. is at its maximum.

DETAILED DESCRIPTIONS

Figure 1:
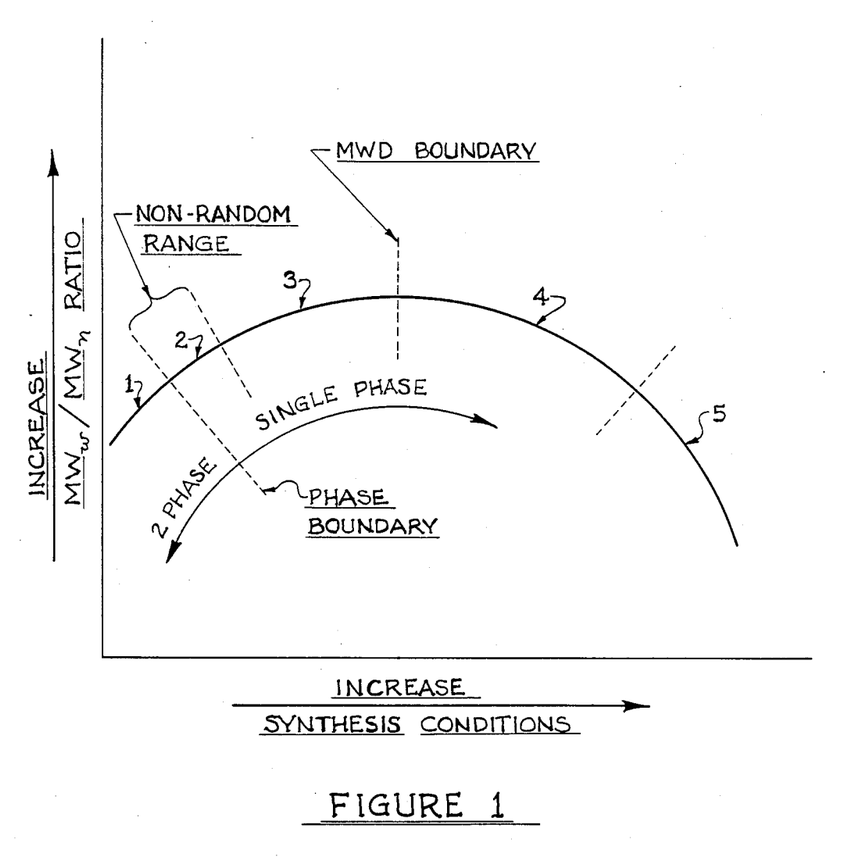
FIG. 1 is presented as a visual aid for relating the present inventive concept.

In FIG. 1 it is shown that as the synthesis conditions are increased substantially beyond the conditions at which the phase boundary is exceeded and at which single phase operation is achieved, there is found an increase in the ratio of weight average molecular weight ($MW_w$) to number average molecular weight ($MW_n$), i.e. a broadening of the MWD occurs, until a molecular weight distribution (MWD) boundary is reached and then surpassed. Referring to FIG. 1, the increase in the ratio of $MW_w/MW_n$ is found to be accompanied by beneficial changes in the properties of films and products made from copolymers which are prepared at temperatures above, and pressures well above, the synthesis conditions at which the phase boundary is reached, and also above the non-randomness range disclosed in U.S. Pat. No. 4,248,990; even further beneficial effects are found beyond the MWD boundary where the MWD is found to decrease and the $MW_w/MW_n$ ratio is narrowing.

Whereas the present inventive concept is perceived as being broadly applicable to interpolymers of ethylene and olefinically-unsaturated organic comonomers, where ethylene comprises the majority amount of the monomer mixture, it is especially applicable to acrylates, methacrylates, vinyl esters, and olefinically unsaturated carboxylic acids as comonomers. It is most especially applicable, and preferably used, in preparing polymers of ethylene interpolymerized with acrylic acid or methacrylic acid. The ensuing descriptions reflect this preference of acrylic acid and methacrylic acid as comonomers.

This disclosure pertains to a process for preparing improved, homogeneous, random ethylene copolymers, especially to improved copolymers of ethylene and carboxylic acid comonomers. It is an objective of this invention to provide ethylene copolymers which are especially well suited for adhesive, coating and/or packaging purposes and as extrusion resins. The objectives of the present invention are accomplished by preparing, especially, a copolymer of ethylene and 0.1-35 weight percent of an $\alpha$, $\beta$-ethylenically unsaturated carboxylic acid (e.g., acrylic acid and methacrylic acid) having a melt index in the range of 0.01 to about 5000 g/10 min (ASTM D1238E). By "homogeneous, random", it is meant that substantially all of the copolymer molecules have substantially the same chemical composition although their molecular weight can vary, and that the copolymer has a ratio of weight percent adjacent acid to total weight percent carboxylic acid in the copolymer less than 0.44 (as determined in accordance with U.S. Pat. No. 4,248,990).

The copolymers of the present invention combine toughness, flexibility and chemical resistance with outstanding transparency, increased heat seal strength, improved hot tack strength, excellent extrusion coating properties and reduced microgel levels. One of the surprising attributes of the copolymers of the present invention is the outstanding transparency obtained at relatively low comonomer concentrations (i.e., <10 percent by wt.). At such low concentrations, the copolymers of the present invention exhibit transparency ordinarily achievable only at high acid concentrations or via the additional preparation step of acid-salt neutralization, e.g. as described in U.S. Pat. Nos. 3,264,272, 4,248,990, and 4,351,931. Thus, these copolymers are extremely useful as high clarity blown films in such applications as flexible packaging where the additional advantages of exceptional draw-down, handleability, adhesiveness and printability (without corona or other forms of pretreatment) as well as excellent processability are observed.

The interpolymers of this invention can also be readily prepared with molecular weight distributions (determined by gel permeation chromatography, which may require esterification pretreatment) suitable for coating applications where improved draw rates, adhesion and heat seal strengths are observed.

The previous ethylene/carboxylic acid copolymers commonly known in the art normally exhibit poor blown film optical properties that preclude their widespread utilization in some packaging applications. Therefore, the known art of acid-salt neutralization for the preparation of "ionomers" is sometimes employed to confer substantial transparency to the acid copolymer. However, ionomer preparation tends to compromise some of the bulk adhesiveness by "neutralizing" carboxyl or acid groups imparting the adhesion. Routinely, blown film converters, coaters and laminators must pretreat the ionomer product to regain adequate adhesion. Other disadvantages of the known route to transparent, adhesive film grade or coating grade products is the fact that the ionomer is rheologically harder to process on conventional polyethylene extrusion equipment (i.e., ionomers draw high amperages and require additional extruder cooling) and is detrimentally moisture sensitive.

The lack of transparency exhibited by commercially known copolymers indicates that these products are characterized by comparatively broad molecular weight distributions and/or inadequate homogeneity. Pieski and Sashihara (U.S. Pat. No. 4,248,990) teach copolymer homogeneity as an attribute of single-phase synthesis. Therefore, to prepare the homogeneous (but non-random) copolymers of U.S. Pat. No. 4,248,990, the position of the phase boundary (i.e., the transition from two-phase to single-phase reaction conditions) must be identified, and the reaction zone must be maintained in steady state at a reactor pressure of from 0 to about 500 psi above, and at a reactor temperature of from 0° to about 15° C. above, that transition point.

The improved homogeneity of the "single-phase" products described in U.S. Pat. No. 4,248,990 is evidenced by lower levels of micro-gels or "grain" than comparable "two-phase" products. However, these "single-phase" products still possess a fair amount of grain due to their preparation at synthesis conditions in the cose proximity of their respective phase boundaries. Such "single-phase" products will also show broader molecular weight distributions (than comparable "two-phase" products) with a subsequent decrease in transparency, and hence, require acid-salt neutralization to achieve the transparency needed for a variety of packaging applications. The broad molecular weight distributions of these "single-phase" products, which are not offset by improved homogeneity, also result in a decrease in the maximum draw rate for film, filament, or coatings as compared to comparable two-phase products.

At synthesis temperatures and pressures above the range specified by Pieski and Sashihara, the resultant single-phase products are said to be random (versus non-random) as indicated by lower ratios of percent adjacent acid to total weight percent carboxylic acid. Such single-phase products (like those prepared at synthesis conditions in the specified range directly above the phase boundary) are assumed to possess increasingly broader molecular weight distributions as reactor temperature and pressures are progressively increased.

With reference to FIG. 1, which plots the $MW_w/MW_n$ ratio vs. synthesis conditions, there is illustrated a curve which reaches an apex that is labeled as the MWD boundary. Near the lower end of the curve corresponding to the lower end of the synthesis conditions, there is shown a phase boundary between two-phase conditions and single-phase conditions. The two-phase portion of the curve is labeled as 1. The non-random single-phase portion disclosed by Pieski and Sashihara (U.S. Pat. No. 4,248,990) is labeled as 2, and represents the relative position of the curve (not drawn to scale) for copolymers made at 0–500 psi above, and 0°–15° C. above, the process conditions at which the phase boundary occurs. All the products made at synthesis conditions above the phase boundary are single-phase products. The part of the curve labeled as 3 represents the relative position of the curve between the non-random single-phase portion (2) and the MWD boundary which lies in the random single-phase portion. Beyond the MWD boundary there is a portion of the random single-phase curve labeled as 4 to represent products having a ratio falling approximately in the same range as portions 2 and 3, but which have unexpected improved properties. A curve portion 5 represents products having about the same ratios one would obtain at the two-phase conditions, but which are an appreciable improvement over the two-phase products. Still referring to FIG. 1, the product improvements found on both sides of the MWD boundary, but substantially above the process conditions which give the non-random products, are within the purview of the present invention, especially those products in portions 4 and 5 of the ratio curve.

In accordance with the present invention, homogeneous, random single-phase ethylene copolymers with significanty improved transparency, heat seal strength and hot tack strength, and with molecular weight distributions similar to two-phase products, are readily prepared well above the position of the phase boundary and above the range of non-randomness discosed in U.S. Pat. No. 4,248,990. Analogous to the phase boundary, we have found that there exists a transition boundary from broad molecular weight distributions to narrow molecular weight distributions. Unlike the phase boundary, the molecular weight distribution (MWD) boundary is not identified by the dramatic changes in initiator demand (efficiency), or by the significant changes in reactor stirrer motor amperage that are well-known to those skilled in the art. However, this position can be conveniently identified at a given comonomer concentration by observing the discontinuity in molecular weight distribution at a constant product melt index and comonomer concentration as synthesis conditions are changed in a manner to pass through the molecular weight distribution (MWD) boundary (FIG. 1). Before reaching this molecular weight distribution (MWD) boundary, random single-phase products exhibit broader molecular weight distributions than comparable two-phase products and non-random single-phase products. However, as the MWD boundary is approached, the random single-phase products will exhibit homogeneity that, surprisingly, offsets their broad molecular weight distributions and permits significantly improved transparency, heat seal strengths and drawdown rates. When synthesis conditions are increased further and/or progressively beyond the MWD boundary, the respective molecular weight distribution correspondingly narrows, i.e., the ratio of $MW_w/MW_n$ decreases. Therefore, it is possible to conveniently prepare "single-phase" products with molecular weight distributions equivalent to "two-phase" products by employing the appropriate synthesis conditions and consequently obtain additional product property improvements. The random single-phase products that are prepared under synthesis conditions at which the MWD boundary is approached, reached, or surpassed are further distinguished from the previously known non-random single-phase products, and the random two-phase products, in that the products of the present invention, at equivalent comonomer concentrations and polymer concentration in the polymerization mixture, will possess a ratio of weight average mol. wt. to number average mol. wt. as defined by $$\log (MW_w/MW_n) = [C_1 + (C_2)(\text{wt. fraction comonomer})] \times [C_3 \text{ or } C_4]$$

where $MW_w$ is the wt. ave. mol. wt., $MW_n$ is the no. ave. mol wt., $C_1$ is the intercept of the wt. fraction comonomer versus $\log (MW_w/MW_n)_{max}$ plot for a given comonomer type, where $(MW_w/MW_n)_{max}$ is the ratio of wt. ave. mol. wt. to no. ave. mol. wt. at the MWD boundary for a given comonomer type, $C_2$ is the slope of the wt. fraction comonomer versus $\log (MW_w/MW_n)_{max}$ plot for a given comonomer type, $C_3$ is a numerical value in the range of about 0.75 to 1.0, preferably about 0.85 to about 1.0, and $C_4$ is a numerical value in the range of about 1.0 to about 0.1, where $C_3$ is employed at process conditions which produce products between the single-phase nonrandom range and the MWD boundary, and where $C_4$ is employed at process conditions which produce products beyond the MWD boundary.

At the MWD boundary, both $C_3$ and $C_4$ are equal to unity.

Since product performance is intimately related to molecular weight distribution (for example, narrow molecular weight distributions are generally required for excellent copoymer transparency, and a relatively broad MWD is usualy required for excellent extrusion coating properties), the ability to prepare a wide range of distinct distributions at a single product melt index allows the manufacture of products suitable for a wide range of film, coating, molding and laminating applications.

Although the exact position of a MWD boundary depends upon comonomer concentration and a number of other variables, tests as above will demonstrate that the position is well above the corresponding phase boundary for the given comonomer concentration. For example, the MWD boundary occurs >2000 psi above, and >15° above, the phase boundary when producing an ethylene/acrylic acid copolymer containing nine percent acrylic acid by weight.

In addition to the ability to "tailor" the desired molecular weight distributions and achieve improved transparency and coating properties, in accordance with the present invention, "single-phase" products prepared just below, at, or beyond the MWD boundary possess less microgels or grain than comparable "two-phase" products as well as less grain than the non-random, "single-phase" products prepared e.g. in U.S. Pat. No. 4,248,990. In fact, at or beyond a corresponding MWD boundary, completely "grain-free" products can be readily prepared. This reduction in microgels or "grain" has an aesthetic appeal, and the presence of excessive amounts of grain can contribute to inadequate heat seal and hot tack strengths, as well as promote delamination by compromising the adhesiveness. The improved heat seal and hot tack strengths of these "single-phase" products is also an object of this invention.

The copolymers of the present invention can be conveniently prepared at reactor pressures from about 18,000 to about 50,000 psi and at reactor temperatures from about 150° to about 350° C. so long as the phase boundary conditions are appreciably exceeded. The preferred reactor is a continuous autoclave with a 1:1 to about a 16:1 L/D ratio. The reactor may consist of one or more reaction zone(s) by installing baffling systems common in the art; the reactor may be in series with one or more other reactors and the reactor may also be provided with one or more comonomer entry point(s) as described by British Pat. No. 1,096,945. Hence, when more than one reaction zone is employed, the reactor(s) can be maintained to provide an "intrazone" and/or "interzone" constant environment or it is also possible to operate in such a manner that a gradient of environments exists between and/or within the zones and/or reactors.

The products of this invention can be prepared with or without the use of solvents or hydrocarbons as telogens and/or carriers for the comonomer(s) and/or initiator(s). These products are also useful as base resins for the preparation of ionic copolymers, known in the art as "Ionomers", wherefrom additional improvements in transparency, chemical resistance and hot tack strength are readily obtained.

The gels that often characterize ethylene/carboxylic acid interpolymers can be of many different shapes, varying sizes and of more than one origin. For instance, microgels or "grain" (i.e., very small and fine gels) are shown in accordance with this disclosure to be an attribute of operating within and/or in the close proximity of a respective phase boundary; large gels (i.e., gels>25μ in diameter) are usually an attribute or the result of thermal oxidation/degradation; however, microgels or "grain" can actually "seed" these larger gels.

In this disclosure, the following gel rating is used:

| Rating | EAA GEL RATING* Criteria |
|---|---|
| 0 | No visible gels |
| 1 | Very few microgels |
| 2 | Some microgels |
| 3 | Some microgels, some large gels |
| 4 | Numerous microgels, some large gels |
| 5 | Numerous microgels, numerous large gels |
| 6 | Severe gels |

*Rating according to criteria by visual inspection of blown film samples.

The following examples are to illustrate embodiments of the present invention, but the invention is not limited to the embodiments illustrated.

EXAMPLE 1

(for comparison purposes)

A 1.5 mil blown film was prepared from an ethylene/acrylic acid copolymer that contained 6.5 percent acrylic acid by weight and had a 2.5 g/10 min melt index (ASTM D1238E). The copolymer was prepared about 0–500 psi above and about 0°–15° C. above its respective phase boundary and the fim exhibited excessive microgels or "grain", a Gardner clarity of 12 percent transmission, a 20° film gloss of 25 percent reflected light, a film haze of 5.5 percent scattered light, a heat seal strength, at a 310° F. sealing bar temperature, of 3.2 lbs/in width and a hot tack strength, at a 300° F. sealing bar temperature, of 150 grams/inch.

EXAMPLE 2

Conversely, a 6.5 percent acrylic acid (by wt.) copolymer having the same melt index was prepared about 3500 to about 4500 psi above and about 16 to about 18° C. above its corresponding phase boundary. The resultant blown film of this product had a Gardner clarity of 47 percent, a 20° gloss of 45 percent, a film haze of 3.2 percent, negligible microgels or "grain", a 4.9 lbs/in heat seal strength at 310° F. and a 200 g/in hot tack at 300° F. Both film samples were fabricated into 1.5 mil film on an NRM 20/1, L/D extruder that was equipped with an air ring, mandrel, annular die, and a take-off unit. Both fabrications maintained 204° C. melt temperature with a 2.25:1 blow-up ratio.

Data for the above examples and for additional samples of ethylene/acrylic acid copolymers are shown in the following tables. Whereas Examples 1, 5, 8, 11 and 15 are examples of prior art used in making non-random copolymers at 0–500 psi above, and 0°–15° C. above, the phase boundary, the remaining examples illustrate various embodiments of the present invention, all of which were produced at a temperature above the phase boundary temperature.

TABLE I

|  | EXAMPLE 1 | EXAMPLE 2 | EXAMPLE 3 | EXAMPLE 4 |
|---|---|---|---|---|
| Percent Acrylic Acid ±0.25 | 6.5[a] | 6.5[a] | 6.5[b] | 6.5[b] |
| Melt Index g/10 min ±0.25 | 2.5 | 2.5 | 2.5 | 2.5 |
| $MW_w/MW_n$ (GPC)* | 7.9 | 10.2 | 10.2 | 9.01 |
| Synthesis Pressure Above Phase Boundary (psi) | 0–500 | 3500–4500 | 3500–4500 | 7500–8500 |
| Blown Film Properties |  |  |  |  |
| Gardner Clarity, % Transmission | 10.9 | 47.1 | 72.1 | 69.4 |
| 20° Film Gloss, % Reflected | 22.5 | 45.1 | 110.5 | 126.6 |
| Percent Haze, % Scattered | 5.42 | 3.2 | 1.59 | 1.08 |
| Gel Rating | 4 | 0 | 0 | 0 |
| Heat Seal Strength @ 310° F., lb/in | 3.0 | 4.9 | — | — |
| Hot Tack Strength 169 300° F., g/in | 150 | 200 | — | — |

[a] Blown Film Fabrication: 204° C., 2.25 BUR, 1.5 mil thickness, NRM extruder
[b] Blown Film Fabrication: 218° C., 3.06 BUR, 1.5 mil thickness, NRM extruder
*GPC refers to gel permeation chromatography for determining molecular wt. distribution.

TABLE II

|  | EXAMPLE 5 | EXAMPLE 6 | EXAMPLE 7 |
|---|---|---|---|
| Percent Acrylic Acid ±0.3 | 9.0 | 9.0 | 9.0 |
| Melt Index g/10 min ±0.25 | 3.0 | 3.0 | 3.0 |
| $MW_w/MW_n$ (GPC) | 6.6 | 8.5 | 9.5 |
| Synthesis Pressure Above Phase Boundary (psi) | 0–500 | 2000–3000 | 3500–4500 |
| Blown Film Properties[a] |  |  |  |
| Gardner Clarity, % Transmission | 13.3 | 24.1 | 48.1 |
| 20° Film Gloss, % Reflected | 32.4 | 41.6 | 70.5 |
| 45° Film Gloss, % Reflected | 65.1 | 62.2 | 81.9 |
| Percent Haze, % Scattered | 4.2 | 3.5 | 1.91 |
| Gel Rating | 5 | 3 | 2 |
| Heat Seal Strength @ 310° F., lb/in | 3.2 | 5.4 | >6.0 |
| Hot Tack Strength @ 300° F. g/in | 150 | 205 | 250 |

[a] Blown Film Fabrication Conditions: 204° C., 2.25 BUR, 1.5 mils (thickness), NRM Extruder

TABLE III

|  | EXAMPLE 8 | EXAMPLE 9 | EXAMPLE 10 |
|---|---|---|---|
| Percent Acrylic Acid ±0.25 | 9.0 | 9.0 | 9.0 |
| Melt Index g/10 min ±0.25 | 3.0 | 3.0 | 3.0 |
| $MW_w/MW_n$ (GPC) | 6.5 | 9.5 | 8.9 |
| Synthesis Pressure Above MWD Boundary (psi) | (4500–3500)* | 0–500 | 2800–3800 |
| Synthesis Pressure Above Phase Boundary (psi) | 0–500 | 3500–4500 | 6800–7800 |
| Blown Film Properties[c] |  |  |  |
| Gardner Clarity, % Transmission | 12.1 | 26.1 | 36.5 |
| 20° Film Gloss, % Reflected | 14.6 | 13.3 | 28.0 |
| 45° Film Gloss, % Reflected | 52.1 | 48.3 | 61.8 |
| Percent Haze | 6.47 | 7.55 | 5.1 |
| Gel Rating | 5 | 3 | 1.5 |

[c] Gloucester Fabrication Conditions: 2½" Extruder, 204° C. melt temp., 2.75 BUR, 1.5 mil thick film, 24/1 L/D
*Connotes 4500–3500 psi below MWD boundary.

TABLE IV

|  | EXAMPLE 11 | EXAMPLE 12 | EXAMPLE 13 | EXAMPLE 14 |
|---|---|---|---|---|
| Percent Acrylic Acid ±0.25 | 6.5 | 6.5 | 6.5 | 6.5 |
| Melt Index g/10 min ±0.25 | 5.5 | 5.5 | 5.5 | 5.5 |
| $MW_w/MW_n$ (GPC) | 7.1 | 10.1 | 13.7 | 10.2 |
| Synthesis Pressure Above Phase Boundary (psi) | 0–500 | 3500–4500 | 5500–6500 | 7500–8500 |
| Synthesis Pressure Above MWD Boundary (psi) | (6500–5500)* | (2500–1500)* | ±500 | 1500–2500 |
| Extrusion Coating Properties[d] |  |  |  |  |
| Neck-in @ fpm (inches) | — | 1.75 | 1.63 | 1.87 |
| Nip Speed (fpm) | 200 | 520 | 530 | 992 |
| Draw-down Speed (fpm) | 730 | 1075 | 1250 | >1500 |
| Minimum Coating (mils) | 2.2 | 0.85 | 0.83 | 0.44 |
| Gel Rating | 5 | 2 | 1 | 0 |
| Heal Seal Strength, @ 310° F., lb/in width | 2.3 | 2.2 | >3.9 | >4.0 |
| Hot Tack Strength, @ 300° F., g/in width | 250 | 340 | 700 | 750 |
| Al adhesion, lb/in width | 0.80 | 0.75 | 1.22 | — |

[d] Black Clawson Extrusion Coater (3½" extruder, 20/1 L/D); melt temperature 550° F., screw speed 85 RPM, air gap 6 inches
*connotes psi below the MWD boundary

TABLE V

|                                                      | EXAMPLE 15  | EXAMPLE 16 |
|------------------------------------------------------|-------------|------------|
| Percent Acrylic Acid ±0.3                            | 9.0         | 9.0        |
| Melt Index g/10 min ±0.25                            | 12.0        | 12.0       |
| $MW_w/MW_n$ (GPC)                                    | 6.5         | 9.2        |
| Synthesis Pressure Above Phase Boundary (psi)        | 0–400       | 3500–4500  |
| Synthesis Pressure Above MWD Boundary (psi)          | (4500–3500)*| ±500       |
| Extrusion Coating Properties[d]                      |             |            |
| Nip Speed (fpm)                                      | 875         | 1275       |
| Draw-down Speed (fpm)                                | 1300        | >1500      |
| Minimum Coating (mils)                               | 0.50        | 0.35       |
| Sealing Properties                                   |             |            |
| Heat Seal Strength @ 260° F., lb/in                  | 4.5         | >4.1       |
| Hot Tack Strength @ 300° F., g/in                    | 350         | 850        |

[d] Black Clawson Extrusion Coater (3½" extruder, 30/1 L/D); melt temperature 550° F., screw speed 85 RPM, air gap 6 inches
*connotes psi below MWD boundary

We claim:

1. A process for producing homogeneous, random interpolymers comprising about 99% to about 65% by weight of ethylene monomer and about 1% to about 35% by weight of at least one olefinically unsaturated comonomer selected from the group comprising unsaturated carboxylic acids, alkylacrylates, alkyl methacrylates and vinyl esters, said process comprising interpolymerizing the monomers in a substantially constant constant environment, under steady state conditions, in a single-phase reaction mixture, under the influence of a free-radical initiator, and in a well-stirred autoclave reactor operated in a continuous manner as the monomers are fed into the reactor and the raection mixture is withdrawn, said process being characterized by
the use of synthesis conditions of temperature and pressure which are elevated to a level high enough above the phase boundary between two-phase and single-phase operation such that the molecular weight distribution (MWD) boundary is reached, or surpassed, the said molecular weight distribution boundary being the highest ratio of weight average molecular weight/number average molecular weight obtainable in single-phase operation, said elevated pressure being greater than 2000 psi above, and said elevated temperature being greater than 15° C. above, the synthesis conditions required at the phase boundary for a given mixture of ethylene and comonomer,
thereby producing an interpolymer having less gels and/or grain.

2. The process of claim 1 wherein the olefinically-unsaturated comonomer comprises acrylic acid or methacrylic acid.

3. The process of claim 1 wherein the olefinically-unsaturated comonomer is acrylic acid.

4. The process of claim 1 wherein the olefinically-unsaturated comonomer is methacrylic 5. The process of claim 1 wherein the so-produced interpolymers comprise from about 99% to about 88% by weight of ethylene units in the polymer chain, the remaining percentage comprising acrylic acid units.

6. The process of claim 1 wherein the so-produced interpolymers comprise from about 99% to about 88% by weight of ethylene units in the polymer chain.

7. The process of claim 1 wherein the synthesis conditions comprise an elevated temperature which is in the range of about 150° C. to about 350° C. and an elevated pressure which is in the range of about 18,000 to about 50,000 psi,
wherein said pressure is at least about 2000 psi above, and said temperature is at least 15° above, the minimum amount needed to produce a single-phase reaction mixture and wherein elevated temperature and elevated pressure are sufficient to substantially exceed the temperature and presusre at which the molecular weight distribution boundary of the so-produced interpolymer is reached.

8. A process for producing substantially homogeneous, random interpolymers comprising about 99% to about 65% by weight of ethylene monomer with about 1% to about 35% by weight of at least one copolymerizable olefinically-unsaturated comonomer selected from the group comprising an unsaturated carboxylic acid, alkyl acrylates, alkyl methacrylates and vinyl esters, said process comprising interpolymerizing the monomers in a well-stirred autoclave reactor operated in a continuous manner at steady state conditions using a free-radical polymerization initiator under substantially constant conditions of temperature, pressure, and flow rates,
wherein the conditions of temperature and pressure required to produce operation at the phase boundary are exceeded, respectively, by using a temperature of at least 15° C. above that at the phase boundary and a pressure of more than 2000 psi above that at the phase boundary,
whereby the molecular weight distribution (MWD) boundary is reached or surpassed,
thereby producing an interpolymer having less gels and/or grain.

9. The process of claim 8 wherein the copolymerizable olefinically-unsaturated comonomer is an unsaturated carboxylic acid.

10. The process of claim 8 wherein the copolymerizable olefinically-unsaturated comonomer is acrylic acid or methacrylic acid.

11. The process of claim 8 wherein the copolymerizable olefinically-unsaturated comonomer is acrylic acid.

12. The process of claim 8 wherein the interpolymer comprises at least about 88% by weight of ethylene groups.

13. A random, homogeneous, single-phase interpolymer product comprising about 65% to about 99% by weight of ethylene monomer, the remaining percentage comprising at least one olefinically-unsaturated comonomer selected from the group comprising unsaturated carboxylic acids, alkyl acrylates, alkyl methacrylates and vinyl esters,
said interpolymer being further characterized as having a weight average molecular weight/number average molecular weight ratio as defined by the formula $$\log(MW_w/MW_n) = (C_1 + (C_2)(\text{wt.fraction comonomer})) \times (C_4)$$

where MWw is the weight average molecular weight, MWn is the number average molecular weight, $C_1$ is the intercept of the wt. fraction comonomer versus log(MWw/MWn)$_{max}$. plot for a given comonomer, where (MWw/MWn)$_{max}$. is the ratio of weight average molecular weight to number average molecular weight at the MWD boundary for a given comonomer, $C_2$ is the slope of the wt. fraction comonomer versus log(MWw/MWn)$_{max}$. plot for a given comonomer, $C_4$ is a numerical value in the range of about 1.0 to about 0.1, representing conditions at, and beyond, the MWD boundary, with $C_4$ being equal to unity at the MWD boundary, said interpolymer being further characterized as having a ratio of weight percent adjacent comonomer unit to total weight percent comonomer in the polymer of less than 0.44 and as having lower levels of gels and/or grain.

14. The interpolymer of claim 13 wherein the ethylene monomer comprises about 88% to about 99% by weight of the polymer.

15. The interpolymer of claim 13 wherein the ethylene monomer comprises about 88% to about 99% by weight of the polymer and the comonomer comprises acrylic acid.

16. The interpolymer of claim 13 wherein the comonomer is an olefinically-unsaturated carboxylic acid.

17. The interpolymer of claim 13 wherein the comonomer is acrylic acid.

18. The interpolymer of claim 13 wherein the comonomer is methacrylic acid.

19. The process of claim 1 wherein the comonomer is an alkylacrylate.

20. The process of claim 1 wherein the comonomer is an alkylmethacrylate.

21. The process of claim 1 wherein the comonomer is a vinyl ester.

22. The product of claim 13 wherein the comonomer is an alkylacrylate.

23. The product of claim 13 wherein the comnomer is an alkylmethacrylate.

24. The product of claim 13 wherein the comonomer is a vinyl ester.

25. A process for producing homogeneous, random interpolymers comprising about 99% to about 65% by weight of ethylene monomer and about 1% to about 35% by weight of acrylic acid comonomer, said process comprising interpolymerizing the monomers in a substantially constant environment, under steady state conditions, in a single-phase reaction mixture, under the influence of a free-radical initiator, and in a well-stirred autoclave reactor operated in a continuous manner as the monomers are fed into the reactor and the reaction mixture is withdrawn, said process being characterized by the use of synthesis conditions of temperature and pressure which are elevated to a level high enough above the phase boundary between two-phase and single-phase operation such that the molecular weight distribution (MWD) boundary is reached, or surpassed, the said molecular weight distribution boundary being the highest ratio of weight average molecular weight/number average molecular weight obtainable in single-phase operation, said elevated pressure being greater than 2000 psi above, and said elevated temperature being greater than 15° C. above, the synthesis conditions required at the phase boundary for a given mixture of ethylene and comonomer, thereby producing an interpolymer having less gels and/or grain.

26. The process of claim 25 wherein the so-produced interpolymers comprise from about 99% to about 88% by weight of ethylene units in the polymer chain.

27. The process of claim 25 wherein the synthesis conditions comprise an elevated temperature which is in the range of about 150° C. to about 350° C. and an elevated pressure which is in the range of about 18,000 to about 50,000 psi, wherein said pressure is at least about 2000 psi above, and said temperature is at least 15° C. above, the minimum amount needed to produce a single-phase reaction mixture and wherein elevated temperature and elevated pressure are sufficient to substantially exceed the temperature and pressure at which the molecular weight distribution boundary of the so-produced interpolymer is reached.

28. A process for producing substantially homogeneous, random interpolymers comprising about 99% to about 65% by weight of ethylene monomer with about 1% to about 35% by weight of acrylic acid comonomer, said process comprising interpolymerizing the monomers in a well-stirred autoclave reactor operated in a continuous manner at steady state conditions using a free-radical polymerization initiator under substantially constant conditions of temperature, pressure, and flow rates, wherein the conditions of temperature and pressure required to produce operation at the phase boundary are exceeded, respectively, by using a temperature of at least 15° C. above that at the phase boundary and a pressure of more than 2000 psi above that at the phase boundary, whereby the molecular weight distribution (MWD) boundary is reached or surpassed, thereby producing an interpolymer having less gels and/or grain.

29. The process of claim 28 wherein the interpolymer comprises at least about 88% by weight of ethylene groups.

30. A random, homogeneous, single-phase interpolymer product comprising about 65% to about 99% by weight of ethylene monomer, the remaining percentage comprising acrylic acid comonomer, said interpolymer being further characterized as having a weight average molecular weight/number average molecuar weight ratio a defined by the formula $$\log(MWw/MWn) = (C_1 + (C_2) \text{ (wt. fraction comonomer)}) \times (C_4)$$

where MWw is the weight average molecular weight, MWn is the number average molecular weight, $C_1$ is the intercept of the wt. fraction comonomer versus log (MWw/MWn)$_{max}$. plot for the comonomer, where (MWw/MWn)$_{max}$. is the ratio of weight average molecular weight to number average molecular weight at the MWD boundary for the comonomer, $C_2$ is the slope of the wt. fraction comonomer versus log(MWw/MWn)$_{max}$. plot for the comonomer, and $C_4$ is a numerical value in the range of about 1.0 to about 0.1, representing conditions at, and beyond, the MWD boundary, with $C_4$ being equal to unity at the MWD boundary, said interpolymer being further characterized as having a ratio of weight percent adjacent comonomer unit to total weight percent comonomer in the polymer of less than 0.44, and as having lower levels of gels and/or grains.

31. The interpolymer of claim 30 wherein the ethylene monomer comprises about 88% to about 99% by weight of the polymer.

32. A process for producing homogeneous, random interpolymers comprising about 99% to about 65% by weight of ethylene monomer and about 1% to about 35% by weight of methacrylic acid comonomer, said process comprising interpolymerizing the monomers in a substantially constant environment, under steady state conditions, in a single-phase reaction mixture, under the influence of a free-radical initiator, and in a well-stirred autoclave reactor operated in a continuous manner as the monomers are fed into the reactor and the reaction mixture is withdrawn, said process being characterized by the use of synthesis conditions of temperature and pressure which are elevated to a level high enough above the phase boundary between two-phase and single-phase operation such that the molecular weight distribution (MWD) boundary is reached, or surpassed, the said molecular weight distribution boundary being the highest ratio of weight average molecular weight/number average molecular weight obtainable in single-phase operation, said elevated pressure being greater than 2000 psi above, and said elevated temperature being greater than 15° C. above, the synthesis conditions required at the phase boundary for a given mixture of ethylene and comonomer thereby producing an interpolymer having less gels and/or grain.

33. The process of claim 32 wherein the so-produced interpolymers comprise from about 99% to about 88% by weight of ethylene units in the polymer chain.

34. The process of claim 32 wherein the synthesis conditions comprise an elevated temperature which is in the range of about 150° C. to about 350° C. and an elevated pressure which is in the range of about 18,000 to about 50,000 psi, wherein said pressure is at least about 2000 psi above, and said temperature is at least 15° C. above, the minimum amount needed to produce a single-phase reaction mixture and wherein elevated temperature and elevated pressure are sufficient to substantially exceed the temperature and pressure at which the molecular weight distribution boundary of the so-produced interpolymer is reached.

35. A process for producing substantially homogeneous, random interpolymers comprising about 99% to about 65% by weight of ethylene monomer with about 1% to about 35% by weight of methacrylic acid comonomer, said process comprising interpolymerizing the monomers in a well-stirred autoclave reactor operated in a continuous manner at steady state conditions using a free-radical polymerization initiator under substantially constant conditions of temperature, pressure, and flow rates, wherein the conditions of temperature and pressure required to produce operation at the phase boundary are exceeded, respectively, by using a temperature of at least 15° C. above that at the phase boundary and a pressure of more than 2000 psi above that at the phase boundary, whereby the molecular weight distribution (MWD) boundary is reached or surpassed, thereby producing an interpolymer having less gels and/or grain.

36. The process of claim 35 wherein the interpolymer comprises at least about 88% by weight of ethylene groups.

37. A random, homogeneous, single-phase interpolymer product comprising about 65% to about 99% by weight of ethylene monomer, the remaining percentage comprising methacrylic acid comonomer, said interpolymer being further characterized as having a weight average molecular weight/number average molecular weight ratio as defined by the formula $$\log(MWw/MWn) = (C_1 + (C_2)(\text{wt.fraction comonomer})) \times (C_4)$$

where MWw is the weight average molecular weight, MWn is the number average molecular weight, $C_1$ is the intercept of the wt. fraction comonomer versus $\log(MWw/MWn)_{max}$ plot for the comonomer, where $(MWw/MWn)_{max}$ is the ratio of weight average molecular weight to number average molecular weight at the MWD boundary for the comonomer, $C_2$ is the slope of the wt. fraction comonomer versus $\log(MWw/MWn)_{max}$ plot for the given comonomer, and $C_4$ is a numerical value in the range of about 1.0 to about 0.1, representing conditions at, and beyond, the MWD boundary, with $C_4$ being equal to unity at the MWD boundary, said interpolymer being further characterized as having a ratio of weight percent adjacent comonomer unit to total weight percent comonomer in the polymer of less than 0.44, and as having lower levels of gels and/or grains.

38. The interpolymer of claim 37 wherein the ethylene monomer comprises about 88% to about 99% by weight of the polymer.

* * * * *

UNITED STATES PATENT AND TRADEMARK OFFICE
CERTIFICATE OF CORRECTION

PATENT NO. : 4,599,392

DATED : July 8, 1986

INVENTOR(S) : Osborne K. McKinney et al.

It is certified that error appears in the above-identified patent and that said Letters Patent is hereby corrected as shown below:

Col. 1, line 51, "east" should be -- least --.

Col. 2, line 31, "empoy" should be -- employ --.

Col. 4, line 14, "copoymers" should be -- copolymers --.

Col. 4, line 58, "cose" should be -- close --.

Col. 5, line 57, "discosed" should be -- disclosed --.

Col. 6, line 68, "copoymer" should be -- copolymer --.

Col. 7, line 1, "usualy" should be -- usually --.

Col. 9, Table I in the first column in the last line "169 300°F., g/in" should be -- @ 300°F., g/in --.

Col. 10, Table IV in the footnote d "20/1" should be -- 30/1 --.

Col. 11, Table V under Example 15 "0-400" should be -- 0-500 --.

Col. 11, line 31, "constant" should be deleted.

Col. 11, line 36, "raection" should be -- reaction --.

Col. 11, line 60, after "methacrylic" insert -- acid --.

Col. 14, line 24, "aboul" should be -- about --.

UNITED STATES PATENT AND TRADEMARK OFFICE
CERTIFICATE OF CORRECTION

PATENT NO. : 4,599,392

DATED : July 8, 1986

INVENTOR(S) : Osborne K. McKinney et al

It is certified that error appears in the above-identified patent and that said Letters Patent is hereby corrected as shown below:

Col. 14, line 51, "molecuar" should be --molecular--; and "a" should be --as--.

Signed and Sealed this

Ninth Day of August, 1988

Attest:

DONALD J. QUIGG

Attesting Officer

Commissioner of Patents and Trademarks